June 25, 1957
H. BUSCH
2,796,670
APPARATUS FOR MEASURING THE INTERNAL
DIMENSIONS OF BORES AND HOLES
Filed June 24, 1953
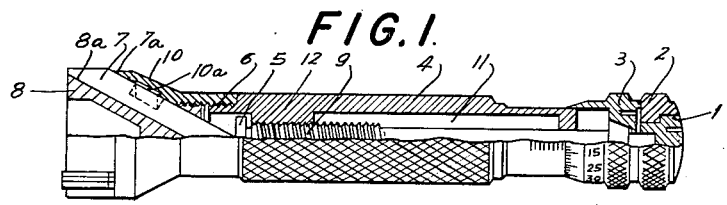
FIG. 1.
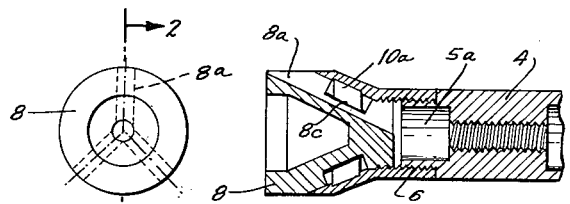
FIG. 2A    FIG. 2
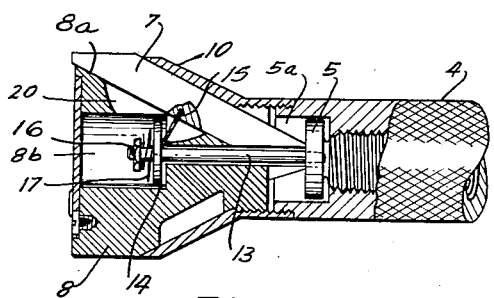    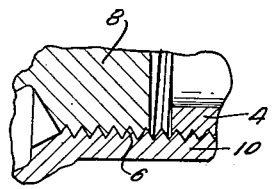
FIG. 4    FIG. 3
INVENTOR.
Hugo Busch
BY
Michael S. Striker
agt.

United States Patent Office 2,796,670
Patented June 25, 1957

2,796,670

APPARATUS FOR MEASURING THE INTERNAL DIMENSIONS OF BORES AND HOLES

Hugo Busch, Radevormwald, Germany

Application June 24, 1953, Serial No. 363,854

Claims priority, application Germany July 9, 1951

5 Claims. (Cl. 33—178)

This application is a continuation-in-part application of my copending application Serial No. 294,778 filed June 21, 1952 now abandoned for an apparatus for measuring the internal diameters of bores and holes.

Various devices for measuring the internal diameters of bores and holes have been known and used in the past and these generally comprise an outer casing, a graduated micrometer screw, a spindle that is moved forward when the micrometer screw is turned, an enlarged head piece, guide slots and measuring feelers e. g. strips or pegs that are pressed against the walls of the bore or hole when the spindle is moved forward. The head of the outer casing of the known devices is provided with a hollow space for accommodating the axial movement of the spindle within the said casing. The said measuring feelers are moved outwards in certain known devices at an angle of about 90 degrees to the direction of forward movement of the spindle. Besides micrometer calipers for round bores have been described in which the measuring feelers are moved outwards at an oblique angle of for instance 45 degrees (compare U. S. P. 2,478,427 and Swiss Patent 239,036). The spindle extends in the last mentioned devices thru the central, longitudinal bore, has practically the same diameter as the said bore and is provided either with a tapered end (compare U. S. P. 2,478,427) or with a plane end (compare Swiss Patent 239,036).

In U. S. P. 2,478,427 it is furthermore mentioned that more accurate testing results may be obtainable when the angle in which the feelers are moved outwards is smaller than 45 degrees. I have however found that it is not possible to obtain accurate testing results when using an angle of less than 45 degrees in a caliper of the kind described in U. S. P. 2,478,427 this being partly due to the fact that the spindle according to the U. S. P. 2,478,427 is provided with a tapered end. When the forward movement of the spindle is to be transferred to the feelers using an angle of 90 degrees the tapered or conical form of the end of the spindle may be in general advantageous. When using however an angle of 45 degrees or less it is disadvantageous as I have found to provide the spindle with a tapered or conical end. The caliper described in Swiss Patent 239,036 is in general identical with the device described in U. S. P. 2,478,427 the spindle being provided however according to the Swiss patent with a plane end. Although this special form of the end of the spindle favours the easy transfer of the forward movement of the spindle to the feelers the device described in Swiss Patent 239,036 cannot give but unsatisfactory testing results because the diameter of the spindle and of its plane end is relatively small so that the inner ends of the feelers lose during the measuring process the full contact and engagement with the plane end of the spindle that is necessary for ensuring accurate testing results. The inventor of the device described in Swiss Patent 239,036 abandoned accordingly the idea of using a plane end of the spindle in the later filed U. S. P. 2,478,427.

One object of my invention is to transfer the forward movement of the spindle to the feelers by means of a plane member situated at the end of the spindle.

Another object of my invention is to select the angle which the ways of the feelers enclose with the longitudinal axis of the caliper between 20 and 50 degrees and preferably between 20 and 30 degrees.

Another object of my invention is to improve and construct my measuring device so that the highest possible accuracy of the testing results is ensured in spite of the said plane member and the said small angle to be used in my device. Especially the length and the diameter of the spindle to be used in my device have been improved with this object in mind.

Another object of my invention is to provide in my device a hollow space between the outer casing and the spindle and to prevent thereby the warmth of the hand of the person carrying out the testing to pass over from the outer casing to the spindle.

Another object of my invention is to improve the construction of the measuring head.

Another object of my invention is to improve the construction with a view to maintain the feelers in a mechanically secured engagement with the plane end of the spindle during the turning back of the spindle.

Other objects of my invention will be apparent from the specification hereafter following.

The measuring device according to my invention comprises in known manner an outer casing, a micrometer screw, a spindle, a measuring head, a plurality of measuring feelers and a guide slot for each feeler.

According to my invention a plurality, preferably three measuring feelers are arranged in the measuring head in such a way that the said measuring feelers are inclined forwardly and outwardly at an angle of 20–50 degrees to the longitudinal axis of my device the said angle being open to the front and being preferably between 20 and 30 degrees. Each part of the graduation scale corresponds to an increase in diameter of 0.01 mm. when using an angle of 26° 33′ 52″, a spindle with a thread pitch of 0.5 mm. and dividing the graduation scale of the micrometer screw into 50 parts. The accuracy of the testing results is greatly improved by arranging the feelers at a small angle as proposed above, provided that certain other teachings of my invention are complied with.

According to my invention the spindle being associated at one end with the micrometer screw mentioned before is provided at its other end with a disc or another plane member. Whereas the diameter of the plane end of the spindle as shown in Swiss Patent 239,036 corresponds with the relatively small diameter of the spindle, the diameter of the disc or plane member according to my invention is of such a size that the inner ends of the measuring feelers are during the whole measuring process in full contact and in operative connection with the said disc or plane member. The preferable diameter of the disc or plane member depends especially on the regulating range that is desired for the device in question. When for instance a regulating range of 10 mm. is desired and an angle of 26° 33′ 52″ is used the diameter of the disc or plane member should preferably be about 17 mm. The diameter of the disc or plane member should preferably be essentially larger than the diameter of the spindle.

In a preferred embodiment of my invention the diameter of the spindle or of at least a considerable part of the spindle is so small that a hollow space can be provided for between the outer casing and the spindle. In this way the undesired transfer of heat from the hand of the person carrying out the testing to the spindle can be decreased or avoided.

The construction of the measuring head and of the neck of my device provides sufficient free space for the disc or plane member to be freely moved back and forth as the spindle is turned forward or backward.

I have furthermore found that it is advantageous when using an angle between 20–50 degrees and a disc or plane member as mentioned before to shorten the length of the spindle so that the spindle does no more extend thru the whole bore as is shown in U. S. P. 2,478,427 but that the end of the spindle in its turned-back position and in consequence thereof the said disc or plane member are situated at least 6 mm. and preferably up to 30 mm. away from the measuring head. It is of course necessary in this case to enlarge correspondingly the length of the measuring feelers so that the inner ends of the measuring feelers extend 6–30 mm. into the bore, the full contact between the inner ends of the feelers and the said disc or plane member being maintained in this way. The advantage of this construction is that the guide ways of the measuring feelers are considerably elongated and that the accuracy of the testing results is improved thereby.

The inner ends of the feelers may be held in operative connection with the said disc or plane member by spring pressure or in any other known way so that the feelers are pushed out of the measuring head as the spindle is moved forward and reenter the head as the spindle is moved backward. According to my invention it is advantageous to improve the construction in this respect by providing a mechanically working fixed connection between the spindle and the means for causing the feelers to reenter the head when the spindle is moved backward.

The measuring head of my device may consist of two parts as is shown in U. S. P. 2,478,427 and in Swiss Patent 239,036. A special feature of my invention is an improvement with regard to the screwing together of the parts of the measuring head. According to the known devices the two parts of the measuring head are screwed together by screws (compare Fig. 3 number 19 of the Swiss patent and Fig. 3 of U. S. P. 2,478,427). I have found that it is preferable to furnish the outer part of the measuring head with a centrally situated thread that renders it possible to screw together the two parts of the measuring head without the aid of screws or other means.

A preferred embodiment of the measuring device according to my invention is now described with reference to the accompanying drawing.

Figure 1 shows the measuring device partly in sectional view and partly in elevation.

Figure 2 shows the head-piece of the measuring device in a sectional view taken on line 2—2 in Fig. 2a and illustrating the arrangement of the guiding slots and of other parts of the head-piece. Fig. 2a is a front view of the device shown in Fig. 2.

Figure 3 illustrates on an enlarged scale, the centrally situated thread for screwing together the two parts of the measuring head.

Figure 4 shows another embodiment having a mechanically working fixed connection between the spindle and the means for causing the feelers to reenter the measuring head when the spindle is turned back.

In Figure 1 number 1 is a fastening screw nut of usual type, numbers 2 and 3 show a micrometer screw of usual type, 3 designating the micrometer drum and 2 the turning drum, the said drums being constructed in such a way that the micrometer drum comes to a stop as soon as the tips of the measuring means contact the walls of the bores to be measured whereas the turning drum may run idle after the said contact has been made. 4 is the outer casing of my device. 9 is the spindle. Between the outer casing 4 and the spindle 9 the hollow space 11 is provided in order to avoid the transfer of heat from the hand of the measuring person to the spindle. 12 designates a part in which no hollow space is provided between the outer casing and the spindle. It may be advantageous to place the thread of the spindle in this part of the device and not near the micrometer screw as it has been customary hitherto because the accuracy of the testing may be improved thereby. 5 designates a flange at the end of the spindle. It can be seen from the drawing that the diameter of the flange 5 is considerably greater than that of the spindle. Flange 5 is located in a recess 5a. 10 designates the outer part of the measuring head, 7 designates one of the feelers and 8 the inner part of the measuring head. Each feeler is arranged in a guide slot or guide way 8a. As shown in Fig. 2a, three guide ways 8a are provided. The outer faces 7a of feelers 7 are flush with the outer surface of inner head 8 and slide along the inner surface of outer head 10 during advance or retraction of the feelers, and during relative turning of the head parts 8 and 10. As shown in Figs. 1 and 2, an annular recess 10a is provided on the inner face of head part 10, and opposite recess 10a, recesses 8c are provided in the walls between guide ways 8a in the inner head part 8. Each of the feelers and of the guide slots forms with the longitudinal axis of the device shown in Figure 1 an angle of 26° 33′ 52″.

In Figure 2 number 6 designates the place where the centrally situated thread for screwing together the two parts of the measuring head is situated. Figure 3 shows this special part in an enlarged form.

Figure 4 shows the mechanically working fixed connection between the spindle and the means for pushing the feelers back into the measuring head when the spindle is turned back. In Figure 4 number 5 designates the flange at the end of the spindle. Pin 13 is an extension of spindle consisting of solid material and connecting a disc 14 with flange 5. Whereas flange 5 has the task to push the feelers out of the measuring head when the spindle is turned forward, disc 14 has the task to push the feelers back into the measuring head when the spindle is turned back. In the special embodiment shown in Figure 4 the said second task is accomplished by providing each feeler with a small peg 15 extending to disc 14 and contacting disc 14 closely so that any return movement of the spindle is transferred by means of pin 13, disc 14 and the peg to the respective feeler. Pegs 15 pass through slots 20 in the inner head part 8. Slots 20 connect guide ways 8a with the cavity 8b in which the disc 14 is located. Preferably pin 13 is provided at its forward end with a small screw 16 and a spring 17 that presses the said disc against the said pegs. In the measuring head sufficient hollow space must be provided for moving the pin and the disc back and forth.

What I claim is:

1. In an apparatus for measuring the diameter of a bore, in combination, an outer hollow head part having an annular rear end portion formed with an inner thread and having an outwardly and forwardly widening front end portion; an inner head part having a cylindrical rear end portion formed with an outer thread threadedly engaging said inner thread of said outer head part and having an outwardly and forwardly widening front end portion located within said widening front end portion of said outer head part, said front end portion of said inner head part being formed with a plurality of angularly spaced guide ways which are inclined outwardly and forwardly at an acute angle to the axis of said head parts; a tubular casing connected to said rear end portion of said outer head part; a micrometer spindle means mounted in said tubular casing reciprocable in axial direction and having a transverse front end face; and a set of feelers non-rotatably and slidably guided in said guide ways and having rearwardly located ends slidably engaging said transverse face of said micrometer spindle means.

2. In an apparatus for measuring the diameter of a bore, in combination, an outer hollow head part having an annular rear end portion formed with an inner thread and having an outwardly and forwardly widening front end portion; an inner head part having a cylindrical rear end portion formed with an axial bore and with an outer thread threadedly engaging said inner thread of said outer head part and having an outwardly and forwardly widening front end portion located within said widening front end portion of said outer head part, said front end portion of said inner head part being formed with a plurality of angularly spaced guide ways which are inclined outwardly and forwardly at an acute angle to the axis of said head parts, said front end portion of said inner head part being formed with an axial recess communicating with said bore, and with slots connecting said recess with said guide ways; a tubular casing connected to said rear end portion of said outer head part; a micrometer spindle means mounted in said tubular casing reciprocable in axial direction and having a transverse front end face; a set of feelers non-rotatably and slidably guided in said guide ways and having rearwardly located ends slidably engaging said transverse front end face of said micrometer spindle means; a pin secured to said front end of said micrometer spindle means and projecting through said bore in said inner head part into said recess; a disc located in said recess and being secured to said pin for movement therewith and with said micrometer spindle means, said disc having a rearwardly facing transverse face; and pegs secured to said feelers and inwardly projecting from the same through said slots into said recess in said inner head part, said pegs having free inner ends slidably engaging said transverse face of said disc, said feelers being retracted by said disc and said pegs when said micrometer spindle means moves in a rearward direction.

3. An apparatus as claimed in claim 2 wherein said guide ways are inclined outwardly and forwardly with respect to the axis of said head parts at an angle of 20 to 30 degrees, and wherein said transverse front end face of said micrometer spindle means is moved during reciprocating movement of the same to a rearwardly located position in which said front end face thereof is spaced at least 6 mm. from said rear end portion of said inner head part.

4. An apparatus as claimed in claim 2 including an adjusting nut screwed to the forward end of said pin; and a resilient means located between said nut and said disc.

5. An apparatus as claimed in claim 2 wherein said micrometer spindle means includes a flange at the front end thereof, and wherein said transverse front end face is located on said flange.

References Cited in the file of this patent

UNITED STATES PATENTS

| | | |
|---|---|---|
| 1,507,272 | Buckingham | Sept. 2, 1924 |
| 2,316,877 | Maag | Apr. 20, 1943 |

FOREIGN PATENTS

| | | |
|---|---|---|
| 239,036 | Switzerland | Dec. 17, 1945 |
| 245,407 | Switzerland | July 1, 1947 |